United States Patent [19]
Butti et al.

[11] 3,829,567
[45] Aug. 13, 1974

[54] ALKALI METAL SALTS OF NUCLEOTIDES USEFUL AS MEDICINES FOR THE FIBRONILITYC SYSTEM

[75] Inventors: Adriano Butti, Como; Giuseppe Prino, Milano; Marisa Mantovani, Villa Guardia, all of Italy

[73] Assignee: Crinos Industria Farmacobiologica S.p.A., Villa Guardia, Italy

[22] Filed: Nov. 2, 1971

[21] Appl. No.: 194,920

[30] Foreign Application Priority Data
Nov. 3, 1970  Italy .................................. 31309/70

[52] U.S. Cl. ........................... 424/180, 260/211.5 R
[51] Int. Cl. ..................... A61k 27/00, C07d 51/50
[58] Field of Search .............. 260/211.5 R; 424/180

[56] References Cited
UNITED STATES PATENTS
3,120,511   2/1964   Tanaka et al. ................ 260/211.5 R
3,168,446   2/1965   Omura et al. ................. 260/211.5 R
3,278,517   10/1966  Marumo et al. .............. 260/211.5 R
3,300,477   1/1967   Jacob et al. ................... 260/211.5 R
3,337,529   8/1967   Laufer ........................... 260/211.5 R
3,374,223   3/1968   Senoo et al. .................. 260/211.5 R
3,382,231   5/1968   Hirahara et al. .............. 260/211.5 R
3,432,487   3/1969   Levin ............................ 260/211.5 R
3,474,002   10/1969  Tanaka .......................... 260/211.5 R
3,510,473   5/1970   Moravek et al. .............. 260/211.5 R

*Primary Examiner*—Johnnie R. Brown
*Attorney, Agent, or Firm*—Alvin Browdy

[57] ABSTRACT

Compositions of matter useful as medicines active on the fibrinolytic system consisting of alkali metal salts of nucleic acids extracted from animal or vegetable tissues and having a phosphorous content from 7.8 to 9.7 percent, a nitrogen content from 13.8 to 17.6 percent and a viscosity not lower than 1.05 centipoises.

6 Claims, No Drawings

ALKALI METAL SALTS OF NUCLEOTIDES USEFUL AS MEDICINES FOR THE FIBRONILITYC SYSTEM

DISCLOSURE OF THE INVENTION

The present invention relates to medicines active on the fibrinolytic system and particularly to new fibrinolytic compositions consisting of alkali metal salts of nucleotides. With the term nucleotides are here indicated those products of extractive origin obtained from animal and vegetable tissues. Usually by the experts in the art such products are called as oligonucleotides and polynucleotides.

The term polynucleotides is used in connection with those products of natural origin consisting of ribonucleic acid and/or deoxyribonucleic acid of high molecular weight; the term oligonucleotides is intended to denote substances of natural origin having a composition analogous to that of polynucleotides but with a lower molecular weight.

There are presently known different types of pharmaceuticals having activity on the fibrinolytic system. The fibrinolytic pharmaceuticals presently known, both of animal or synthetic origin, are manufactured by complicated processes and frequently have dangerous side effects.

It is therefore an object of this invention to provide new compositions having activity on the fibrinolytic system which can be manufactured in a very simple way and which do not show undesired side effects.

The fibrinolytic compositions according to the present invention consist of alkali metal salts of oligonucleotides, of extractive origin from animal or vegetable tissues and more particularly they are alkaline salts of ribonucleic acid (RNA) and/or deoxyribonucleic acid (DNA). These compositions are characterized by a viscosity not lower than 1.05 centipoises, by a phosphorous content in the range from 7.8 to 9.7 percent, and by a nitrogen content in the range from 13.8 to 17.6 percent.

The fibrinolytic compositions according to the present invention may be obtained by extraction from easily available materials such as suitable cultures of microorganisms, vegetable tissues and animal organs.

An extractive process to obtain in an economical manner from animal organs, such as lungs, placenta, intestine, duodenum, pancreas, liver and so on .., the fibrinolytic compositions according to the present invention is, for example, that relating to the extraction of DNA and which forms the subject matter of another patent application of the same applicant, namely Ser. No. 194,919 filed on end date herewith; now U.S. Pat. No. 3,770,720.

The alkaline salts of RNA and DNA and of the oligonucleotides are characterized by a fibrinolytic activity which becomes evident at the dose of 8–10 mg/Kg after treatment intravenously on laboratory animals. Under the same experimental conditions the anticoagulant activity, measured as prothrombin time and recalcification time, is hardly evident even at the dose of 50–60 mg/Kg.

This pharmacological behavior, and particularly the activity on the fibrinolytic system, of the poly- and oligonucleotides have been never before disclosed.

Administered intravenously the alkali metal salts of nucleotides according to the present invention do not cause any evidence of toxicity or side effects, even at doses of 300 mg/Kg.

Clinical investigations, conducted on healthy subjects or on patients affected by peripheral vasculopthies or arteriosclerotic phenomena, have confirmed the increase of the fibrinolytic potential of plasma after injections of these preparations. The following examples, which illustrate the invention but do not limit its scope, refer to administrations carried out intravenously, nevertheless it is obvious that the compositions according to the present invention may be administered in other ways.

EXAMPLE 1

This example illustrates the pharmacological activity of the compositions according to the present invention. It concerns the measuring on normal and pre-heated fibrine plates of fibrinolytic activity of euglobulinic fractions separated from rat plasma activated in vitro with RNA and DNA of bacterial origin (method described by Prino et Mantovani in Europ. J., Pharmacol. 6, 190, 1969).

| Substance | $\gamma$/ml of plasma | Normal plates | | Pre-heated plates | |
|---|---|---|---|---|---|
| | | areas of lysis in mm$^2$ average ± S.E. | % | areas of lysis in mm$^2$ average ± S. E. | % |
| RNA | — | 59.6 ± 2.5 | — | 41.4 ± 0.9 | — |
| | 25 | 72.7 ± 3.9 | + 22 | 53.4 ± 0.4 | + 29 |
| | 50 | 81.0 ± 2.6 | + 36 | 70.2 ± 1.3 | + 69 |
| | 100 | 100.3 ± 2.5 | + 78 | 83.4 ± 1.6 | +101 |
| | 200 | 113.3 ± 1.5 | + 90 | 98.7 ± 1.4 | +138 |
| DNA | — | 34.7 ± 6.7 | — | 35.3 ± 1.0 | — |
| | 25 | 71.2 ± 3.6 | +105 | 43.5 ± 0.7 | + 23 |
| | 50 | 76.2 ± 3.0 | +119 | 46.3 ± 0.8 | + 31 |
| | 100 | 86.1 ± 4.5 | +248 | 53.4 ± 0.8 | + 51 |
| | 200 | 88.3 ± 2.7 | +154 | 56.0 ± 0.6 | + 58 |

EXAMPLE 2

Also this example illustrates the pharmacological activity of the compositions according to the present invention and concerns the measuring on normal and preheated fibrine plates, of the fibrinolytic activity of euglobulinic portions separated from rat plasma activated in vitro with oligonucleotides of animal origin at different viscosity grades.

| Viscosity in centipoises | γ/ml of plasma | Normal plates | | Pre-heated plates | |
|---|---|---|---|---|---|
| | | areas of lysis in mm² average ± S.E. | % | areas of lysis in mm² average ± S.E. | % |
| | — | 47.3 ± 2.1 | — | 39.3 ± 1.0 | — |
| | 25 | 67.6 ± 2.1 | + 43 | 52.1 ± 0.8 | + 32.6 |
| 1.348 | 50 | 80.0 ± 4.2 | + 69 | 63.4 ± 1.3 | + 61 |
| | 100 | 117.7 ± 7.2 | +148 | 82.0 ± 2.2 | +109 |
| | — | 59.5 ± 3.0 | — | 46.5 ± 1.3 | — |
| | 50 | 66.0 ± 4.6 | + 11 | 51.9 ± 1.7 | + 11.8 |
| 1.070 | 100 | 57.7 ± 2.1 | − 3 | 53.1 ± 1.4 | + 14.1 |
| | 200 | 76.8 ± 2.4 | + 29 | 53.1 ± 1.0 | + 14.1 |

The viscosity of the materials described in this and in the following examples has been measured in 0.5 molar solution of sodium chloride wherein the product has been dissolved in the ratio of 1 percent. The tests have been carried out at 20°C. in a Hoppler viscometer (internal diameter of the tube mm. 15.950; falling distance mm. 100) using the sphere N.1 (∅ mm. 15.805, weight gr. 4.9848). Under these conditions the 0.5 molar solution of sodium chloride gives a falling time of the sphere of 70.8 inches corresponding to a viscosity of 0.9841 centipoises.

EXAMPLE 3

The following example, which illustrates the pharmacological activity, relates to a treatment with oligonucleotides of animal origin, administered intravenously in the rabbit. Strengthening effect on the fibrinolytic activity of a small fixed quantity of urokinase (UK = 10 U. Ploug/ml) added "in vitro" to the plasma of the animals according to the method described by: Prino et Mantovani in "Min. med. 60, 5015 (1969)."

| Intravenous treatment mg / Kg. | areas of lysis (mm²) measured in samples drawn at different times from the treatment | | | |
|---|---|---|---|---|
| | 0 min. | 5 min. | 10 min. | 15 min. |
| 8 | 82.6 ± 0.9 | 125.2 ± 3.2 | 109.0 ± 4.1 | 98.5 ± 6.4 |
| 16 | 69.0 ± 2.7 | 113.0 ± 7.5 | 108.3 ± 4.7 | 96.6 ± 8.8 |
| 32 | 86.1 ± 6.1 | 160.1 ± 5.1 | 141.7 ± 8.5 | 135.3 ± 8.9 |

EXAMPLE 4

This example illustrates the anticoagulating activity in vitro on rat blood in comparison with the activity of heparin, known anticoagulant for comparisons.

| Substance | γ/ml of blood | Coagulation time in seconds average ± S.E. | | % |
|---|---|---|---|---|
| — | — | 175.87 | ± 1.5 | 100 |
| Heparin | 3 | 281.5 | ± 4.3 | 160 |
| do. | 4.5 | 339.2 | ± 4.9 | 193 |
| do. | 6.75 | 452.0 | ± 20 | 257 |
| do. | 10.125 | 735.2 | ± 38.8 | 418 |
| compositions | 50 | 153.5 | ± 1.3 | 87.3 |
| according to | 100 | 165.2 | ± 0.9 | 94.9 |
| the present | 200 | 170.2 | ± 1.2 | 96.8 |
| invention | 400 | 188.7 | ± 9.65 | 107.3 |

As it appears from the above table, the compositions according to the present invention have a remarkably low anticoagulating activity.

EXAMPLE 5

This example concerns the clinical activity and relates to the fibrinolytic activity of oligonucleotides in man, in comparison with the placebo.

| Preparations | Time of euglobulinic lysis | | | Areas of lysis (mm²) | | | |
|---|---|---|---|---|---|---|---|
| | 30' | 60' | 120' | 0 | 30' | 60' | 120' |
| Placebo n = 25 | — | −12% | −15% | − 8% | 79.4±10 | 80.2±6 | 98.4±12 | 84.3±9 |
| Extractive oligonucleotides | — | −25% | −69% | −54% | 88.2± 7 | 139 ±6 | 201.6±8 | 150.2±10 |

The euglobulinic lysis time is expressed as percent variation with reference to zero time.

What is claimed is:

1. Therapeutic composition in unit dosage form useful as medicines from the fibrinolytic system, comprising an effective amount sufficient to increase the fibrinolytic potential of plasma with no substantial anticoagulating effect of an aqueous solution of an alkali metal salt of a polynucleotide or an oligonucleotide of ribonucleic acid or deoxyribonucleic acid having a phosphorous content in the range from 7.8 to 9.7 percent, a nitrogen content in the range from 13.8 to 17.6 percent and a viscosity not lower than 1.05 centipoises.

2. A composition according to claim 1, characterized in that the viscosity of said alkali metal salt is in the range from 1.25 to 1.85 centipoises.

3. A method of increasing the fibrinolytic potential of plasma with no substantial anticoagulating effect comprising adding to the plasma an effective amount of an aqueous solution of an alkali metal salt of a polynucleotide or an oligonucleotide of ribonucleic acid or deoxyribonucleic acid having a phosphorous content in the range from 7.7 to 9.7 percent, a nitrogen content in the range from 13.8 to 17.6 percent and a viscosity not lower than 1.05 centipoises.

4. A method of treating animals and humans in need of a fibrinolytic composition comprising administering to such animals and humans an effective amount of aqueous solution of an alkali metal salt of a polynucleotide or an oligonucleotide of ribonucleic acid or deoxyribonucleic acid having a phosphorous content in the range from 7.7 to 9.7 percent, a nitrogen content in the range from 13.8 to 17.6 percent and a viscosity not lower than 1.05 centipoises.

5. A method in accordance with claim 4 wherein said composition is administered in the dose of 8 – 10 mg/kg.

6. A method in accordance with claim 4 wherein said administration is carried out intravenously by means of an aqueous solution of an alkali metal salt of an oligonucleotide having a viscosity between 1.05 and 1.85 centipoises.

* * * * *